US005752093A

United States Patent [19]

Ishiguro et al.

[11] Patent Number: 5,752,093
[45] Date of Patent: May 12, 1998

[54] BUILT-IN FLASH CAMERA

[75] Inventors: Minoru Ishiguro; Hideo Yoshida, both of Omiya, Japan

[73] Assignee: Fuji Photo Optical Co., Ltd., Saitama, Japan

[21] Appl. No.: 931,240

[22] Filed: Sep. 16, 1997

Related U.S. Application Data

[63] Continuation of Ser. No. 652,302, May 23, 1996, abandoned.

[30] Foreign Application Priority Data

May 26, 1995 [JP] Japan .................................. 7-128520

[51] Int. Cl.⁶ .................................................. G03B 7/08
[52] U.S. Cl. ........................................................ 396/61

[56] References Cited

U.S. PATENT DOCUMENTS

| | | |
|---|---|---|
| 4,941,009 | 7/1990 | Yoshida .................. 354/402 |
| 5,214,467 | 5/1993 | Yoshida et al. . |
| 5,255,047 | 10/1993 | Ishimaru et al. ............... 354/416 |
| 5,440,369 | 8/1995 | Tabata et al. .................. 354/432 |

FOREIGN PATENT DOCUMENTS

| | | |
|---|---|---|
| 56-149022 | 11/1981 | Japan . |
| 8-171118 | 7/1996 | Japan . |

Primary Examiner—Daniel P. Malley

[57] ABSTRACT

An active type focusing part, including a projector and a light acceptor, is capable of measuring a reflectance of the main subject. When a distance measured by the focusing part is smaller than a predetermined distance, the reflectance is measured. A strobe light control part controls a strobe light in accordance with the measured distance, the measured reflectance, and a brightness measured by a photometry part. The strobe light control part decreases an exposure of the strobe light as the measured reflectance increases, so that the exposure of the strobe light is set appropriately.

20 Claims, 9 Drawing Sheets

OPENING SHUTTER

STROBE FLASHING

EXPOSURE

STROBE FLASHING

EXPOSURE

BUILT-IN FLASH CAMERA

This application is a continuation of application Ser. No. 08/652,302 filed on May 23, 1996, now abandoned.

BACKGROUND OF THE INVENTION

1. FIELD OF THE INVENTION

The present invention relates to a built-in flash camera and more particularly to a built-in flash camera capable of taking a picture under a proper exposure by means of an automatic exposure function and an electronic flash (strobe).

2. DESCRIPTION OF THE RELATED ART

If a picture is taken under back lighting, there is a problem in that an object looks dark. Furthermore, the object is shadowed when taking a picture in the condition that the sun is just above the object even though there is no back lighting. In order to prevent the above-mentioned problem, there is known a method for using the strobe regularly even in the daylight (regular flash type), so that a strobe light can be added to the exposure of the external light.

Because the latitude of a negative color film is large with respect to an overexposure, it is preferable to always use the strobe when the negative color film is used.

The conventional built-in flash camera of the regular flash type is disclosed in, for example, a Japanese Patent Application Laid-open No. 56-149022.

There is a proposed another built-in flash camera in which the strobe is flashed regularly. This camera is provided with a photometry part for measuring an external light brightness, and a focusing part for measuring a distance up to a main subject. Thus, the exposure of the strobe light is gradually controlled in accordance with the external light brightness and the distance (refer to the Japanese Patent Application No. 6-255599, Publication No. 8-171718).

Generally, an ordinary average reflectance is found to be 18% on the basis of many experimental results. Therefore, the conventional built-in flash camera controls a shutter, a stop, and etc. so as to obtain a proper exposure with respect the average reflectance of 18%. Moreover, a strobe light is adjusted to provide the proper exposure when the average reflectance of an object is 18%. In this case, however, there is a problem in that a satisfactory photograph can not be obtained when the reflectance of the object is excessively high, or low.

For example, the reflectance becomes high in the case that a person puts on a white dress, wears makeup on her face. In such a condition, the object is washed out on the photograph because of an overexposure on an image surface.

Thus, in the case that the strobe light is controlled on the basis of the average reflectance (18%), is difficult to photograph under the excessively high or low reflectance because of the overexposure on the image surface. As a result, there is a problem in that a photographing can not be performed well.

SUMMARY OF THE INVENTION

The present invention has been developed in view of the above-described circumstances, and has its object to provide a built-in flash camera which measures a reflectance of the object and controls the strobe light in accordance with the measured reflectance so as to photograph the object under an optimum exposure.

To achieve the above-mentioned object, the built-in flash camera including a strobe according to the present invention comprises a photometry part for measuring a brightness within a shot visual field, a focusing part for measuring a distance up to a main subject within the shot visual field, a reflectance measuring part for measuring a reflectance of the main subject, an automatic exposure mechanism for opening and closing a diaphragm shutter so as to obtain a standard exposure under external light, of which brightness is more than a reference external light brightness, an strobe light control part for directing the strobe to flash in connection with the opening and closing of the shutter and for decreasing the exposure of the strobe in accordance with the measured distance and the measured reflectance. The reference external light brightness is an external light brightness at which an optimum exposure is obtained in a predetermined shutter open time, and the standard exposure is an exposure in the reference external light brightness.

The present invention has been developed in consideration of the following point. That is, the exposure on an image surface is large in the case of the main subject having a high reflectance, and is small in the case of the main subject having a low reflectance. The built-in flash camera of the present invention controls the exposure of the strobe in accordance with reflectance of the main subject.

Therefore, the exposure on an image surface is set properly even if the reflectance of the main subject changes.

According to the present invention, the exposure of the strobe is controlled in accordance with the distance up to the main subject, which is measured by the focusing part, and the reflectance of the main subject, which is measured by the reflectance measuring part. As a result, the exposure on the image surface can be set properly.

Furthermore, according to the present invention, the exposure of the strobe is decreased as the measured reflectance becomes high. As a result, it is possible to performing a satisfactory photographing even if the reflectance of the main subject is excessively high or low.

In the control of the strobe exposure, it is effective to determine the exposure of the strobe light in accordance with RO/R which is the ratio between the reflectance R measured by the reflectance measuring part and a predetermined reference reflectance RO.

Furthermore, the built-in flash camera of the present invention is provided with an active type focusing part which comprises projecting means for projecting a light to the main subject and light accepting means for accepting a reflection light from the main subject. The focusing part measures the distance up to the main subject and a reflectance of the main subject in accordance with the accepted reflection light. As a result, one focusing part is also used as means for measuring the reflectance, so that the structure of the built-in flash camera can be simplified.

Moreover, the strobe light control part can increase the decreased quantity of the exposure of the strobe, which is gradually decreased as the measured reflectance is high, only when the measured distance is short to the extent that all of the projected light from the projecting means reaches the main subject. As a result, the reflectance of the main subject can be correctly measured, so that a correct control of the strobe exposure can be performed when the photographing is greatly influenced by the reflectance.

Further scope of applicability of the present invention will become apparent from the detailed description given hereinafter. However, it should be understood that the detailed description and specific examples, while indicating preferred embodiments of the invention, are given by way of illustration only, since various changes and modifications

3 within the spirit and scope of the invention will become apparent to those skilled in the art from this detailed description.

DESCRIPTION OF THE PREFERRED EMBODIMENT

Figure 1:
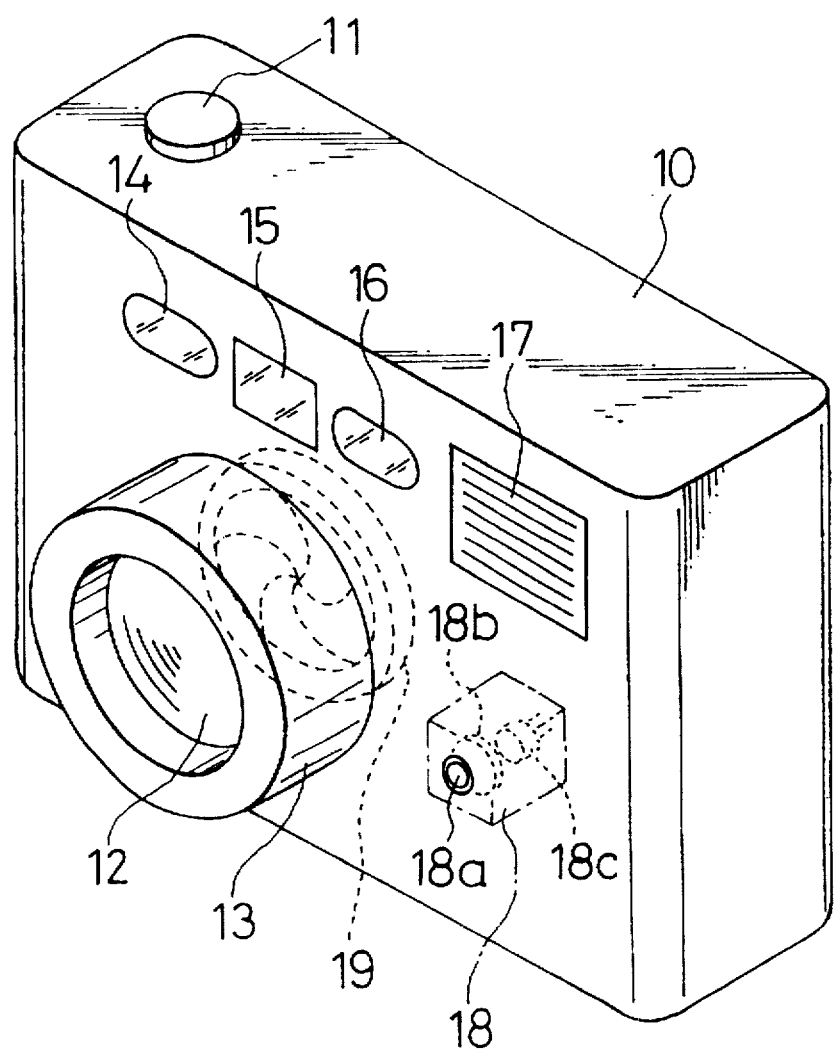
FIG. 1 is a perspective view illustrating an external appearance of an embodiment of a built-in flash camera according to the present invention.
Figure 2A:
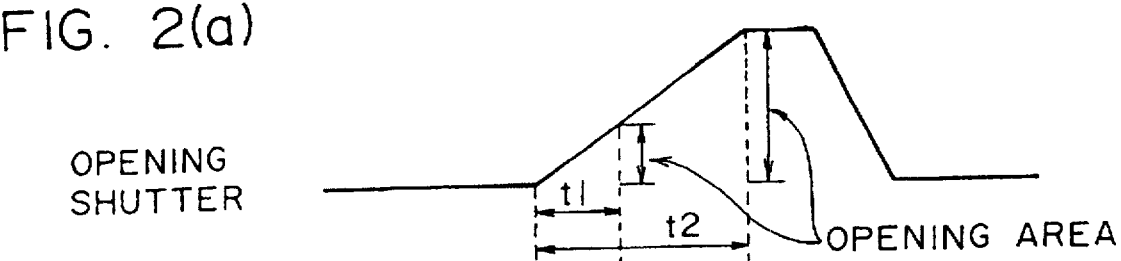
FIG. 2(a), 2(b), 2(c), 2(d) and 2(e) are time charts illustrating a relationship between a shutter opening timing and a flash timing.
Figure 2B:
Figure 2C:
Figure 2D:
Figure 2E:
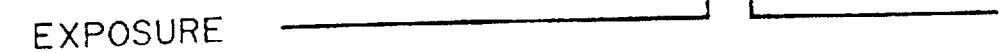

FIG. 1 is a perspective view illustrating an external appearance of an embodiment of a built-in flash camera according to the present invention. In a rectangular parallelepiped built-in flash camera of FIG. 1, a shutter button 11 is arranged on a top surface of a camera body 10, and a mirror barrel 13 in which a taking lens 12 is incorporated, is attached at a central portion on a front surface of the camera body 10.

A projector 14, a finder 15, a light acceptor 16, and an strobe 17 are arranged on an upper portion of the front surface of the camera body from the left of the drawing. The projector 14 and the light acceptor 16 compose a focusing part for measuring a distance from the camera to the subject, and a reflectance measuring part for measuring a reflectance of the main subject. The focusing part measures the distance on the basis of, for example, a principle of triangulation.

The reflectance measuring part measures the reflectance of the main subject in accordance with the quantity of the light projected from the projector 14 and that of the light accepted by the light acceptor 16.

A photometry part 18 for measuring the brightness of the external light within the visual field, is provided at the right side of the mirror barrel 13 on the front surface of the camera body 10. The photometry part 18 is provided with an incident window 18a which is formed on the surface of the camera body 10, a lens 18b which is arranged within the incident window 18a, and a photo sensor 18c in which a light accepting surface is arranged in a proximity of the imageforming position of the lens 18b.

4

The light accepting surface of the photo sensor 18c is arranged at a position displaced from an image-forming position of the lens 18b by a predetermined distance. Therefore, a perfect object image is not formed on the light accepting surface of the photo sensor 18c, and an average quantity of the external light in the whole visual field including the object is measured by the photo sensor 18c.

Furthermore, a shutter 19 for providing a film with the required exposure is provided on the optical axis of the taking lens 12 within the camera body 10.

The strobe 17 automatically flashes in a timing at which the shutter 19 is opened (synchronized flash). In this embodiment, the flash timing of the strobe 17 is subtly staggered from an open timing of the shutter 19, so that exposure on the surface of the main subject can be adjusted. The shutter 19 is a diaphragm shutter, which serves as both a diaphragm and a shutter.

How to adjust the exposure will be explained with reference to the time chart of FIG. 2. The time chart of FIG. 2 shows how much exposure can be obtained by flashing the strobe 17 after the shutter 19 starts working. As shown in FIG. 2 (a), the opening area of the shutter 19 is still small when the strobe is flashed when a time t1 has passed after the shutter starts working (see FIG. 2 (b)), and the light which exposes the film is small. So, the exposure is small.

On the other hand, when the strobe is flashed when a time t2 has passed after the shutter starts working (see FIG. 2 (d)), the opening area of the shutter 19 is the largest, so the light which exposes the film is large. As a result, the exposure is almost twice as much as the exposure in the time t1 (see FIG. 2 (e)). Thus, the flash timing of the strobe 17 is adjusted so that the exposure of the strobe 17 can be freely adjusted without changing the emission quantity of the strobe 17.

In this embodiment, the flash timing of the strobe light for obtaining the optimum exposure for photographing is controlled by a distance between the camera and the main subject measured by the projector 14 and the acceptor 16, the reflectance of the main subject, and the brightness measured by the photometry part 18.

Figure 3:
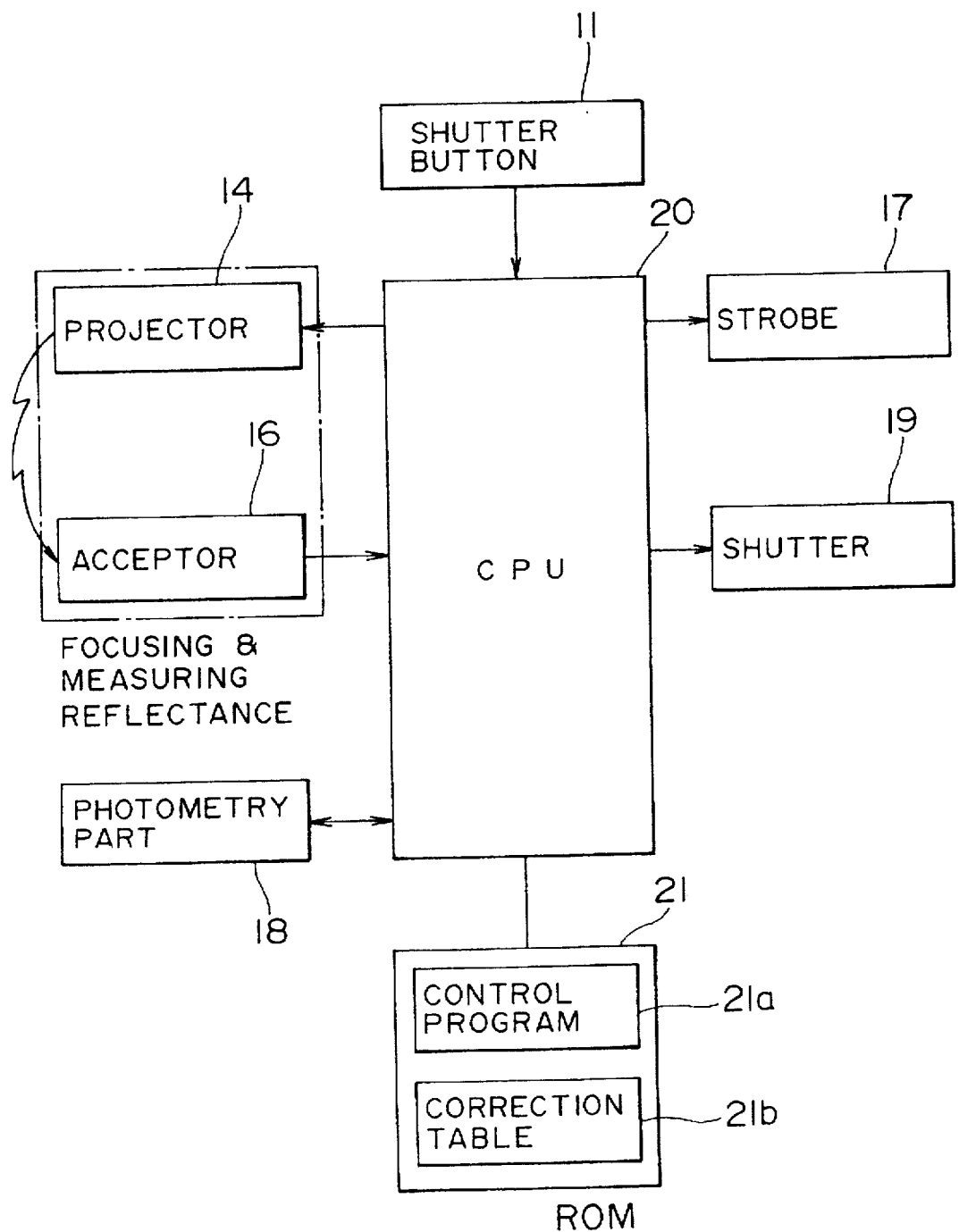
FIG. 3 is a block diagram illustrating a structure for controlling the flash timing.

FIG. 3 is a block diagram illustrating a specific structure for controlling a flash timing. As shown in FIG. 3, the flash timing is controlled by a CPU 20 on the basis of a control program 21a, which is written in a ROM 21.

The CPU 20 receives a half-push signal or a full-push signal from the shutter button 11. When the CPU 20 receives the half-push signal from the shutter button 11, the CPU 20 provides the projector 14 with a signal for measuring the distance up to the main subject and the reflectance of the main subject, and provides the photometry part 18 with a signal for measuring the brightness within the visual field.

The projector 14 and the light acceptor 16 of FIG. 3 is a so-called active type focusing deirce, in which a light is projected from the built-in flash camera toward the main subject, and the reflection light from the main subject is accepted by a position sensing device (PSD). Thus the distance up to the main subject can be measured by a principle of triangulation on the basis of the angle between the projector 14 and the light acceptor 16. Furthermore, the reflectance of the main subject is also measured from the quantity of the light accepted by the light acceptor 16.

A luminous flux $\emptyset$ of the reflection light of the main subject, which is accepted by the position sensing device, is found from following equation:

$$\emptyset = K \cdot R \cdot 1/D^2$$

where K is a constant, R is a reflectance of the main subject, and D is a distance up to the main subject.

Also, a photocurrent is found from the following equation:

$$I=K'\cdot R\cdot 1/D^2$$

where K' is a constant.

Accordingly, the reflectance R of the main subject is calculated from the constant K' and the distance D.

In order to measure the reflectance by the projector 14 and the light acceptor 16, it is necessary that the light projected from the projector 16 reaches the main subject perfectly. That is, the distance up to the main subject should be short to the extent that the projected light perfectly reaches the main subject, for example, a face of a person. Accordingly, a distance Ds for a reference is predetermined. That is, the reflectance is not perfectly measured when the distance is over Ds. When the distance measured by the focusing part 18 is less than Ds, the reflectance is measured. On the other hand, in the case when the distance measured by the focusing part 18 is more than Ds, the reflectance may be measured; However, the measurement result may not be used because an accuracy of the result is not satisfactory. So, in this embodiment, the reflectance is not measured when the distance measured by the focusing part 18 is more than Ds.

The projector 14 and the light acceptor 16 perform the focusing and the measurement of the reflectance, and the photometry part 18 performs the photometry in accordance with the above-mentioned signals from the CPU 20, and respectively provide the CPU 20 with the measurement results.

Further, when the CPU 20 receives the full-push signal from the shutter button 11, the CPU 20 provides the strobe 17 with a signal for flashing, and provides the shutter 19 with a signal for opening and closing the shutter.

Figure 4:
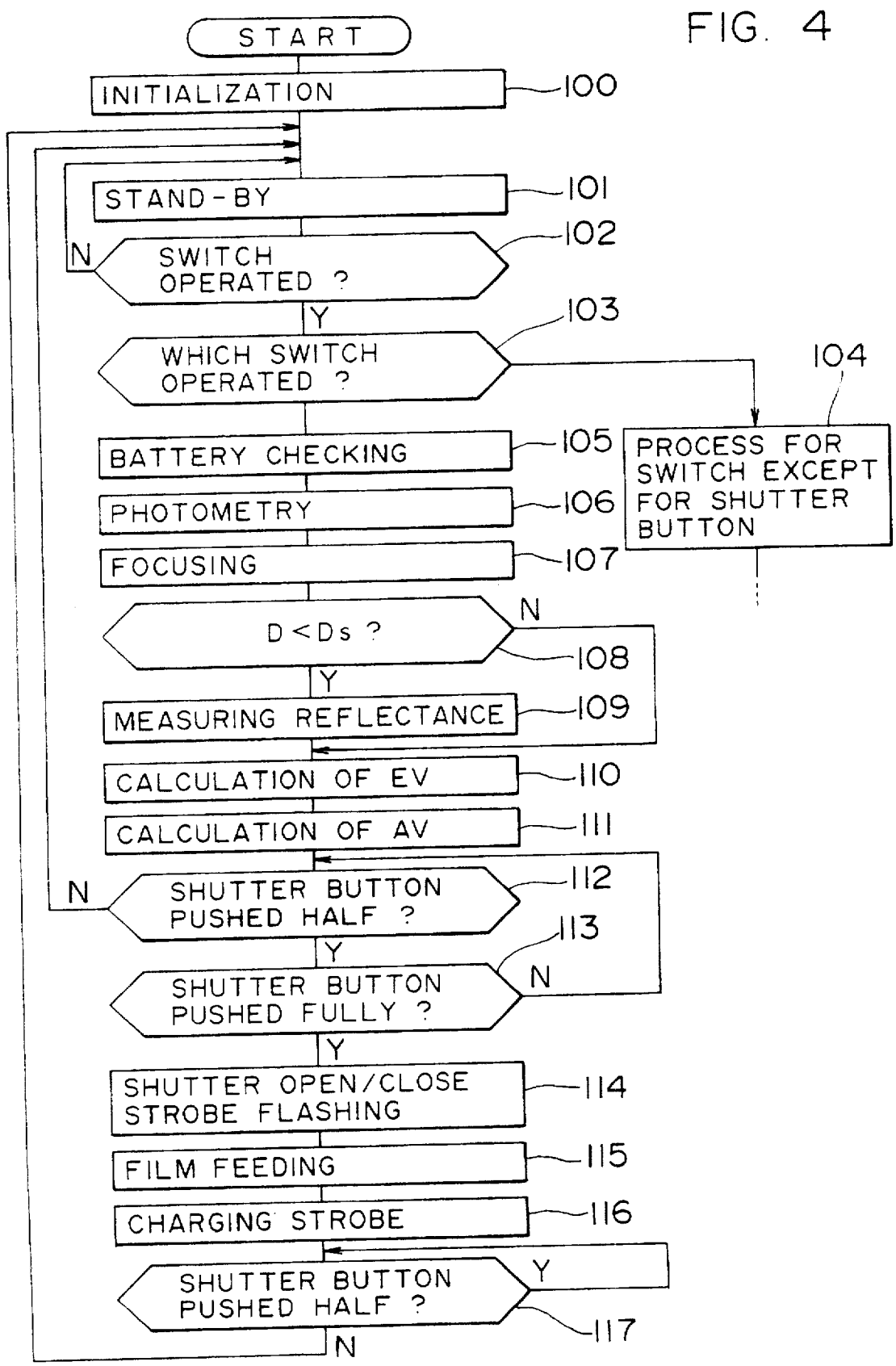
FIG. 4 is a flow chart illustrating a procedure for controlling the flash timing.

Next, an explanation will be given of a flow in a processing of controlling the flash timing which is performed by the CPU 20 on the basis of the control program 21a with reference to the flow chart in FIG. 4.

First, when the power source switch is turned on, the initialization processing such as clearing the memory included in the CPU 20 and setting an I/O port, are carried out (Step 100). Then, the processing waits until some switch is started (Step 101). There is a self-timer switch, and a zoom switch, which are not shown in the drawing, in addition to the shutter button 11. When one of the switches is started (Step 102), it is detected which switch has been started (Step 103). If the switch other than the shutter button 11 has been started, the processing for each switch is performed (Step 104).

When it is detected that the shutter button 11 is half pushed in the step 103, the residual capacity of the power source electronic battery is checked (Step 105). Next, the signal from the CPU 20 is received by the photometry part 18, and the external light brightness in the shot visual field is measured by the photometry part 18 (Step 106). Furthermore, the signal from the CPU 20 is received by the projector 14, and the distance between the camera and the object is measured by the projector 14 and the acceptor 16 (Step 107). Then the distance measured in Step 107 and the predetermined distance Ds are compared to each other (Step 108). When the distance measured in Step 107 is less than the distance Ds, the reflectance of the main subject is measured (Step 109).

On the other hand, when the distance measured in Step 107 is more than the distance Ds, the reflectance of the main subject is not measured, and the processing proceeds to Step 110.

Then an apex value (BV) of the external light brightness, which has been found in the step 106, and an apex value (SV) of the film sensitivity are substituted for the following equation (1), so that an exposure value EV, which is a control value for the shutter 19, can be calculated (Step 110). The above-mentioned calculation is called an automatic exposure (AE) calculation.

$$EV=SV+BV\ldots \quad (1)$$

By the calculation of the EV value, it is possible to determine a combination of the shutter speed and the stop value for obtaining the exposure required for photographing.

Next, an aperture value AV is calculated so as to calculate the flash timing of the strobe 17 (Step 111). This is called a FM (flashmatic) calculation. The AV value corresponds to the opening area of the shutter 19 when the strobe 17 is flashed. That is, it can be judged from the AV value which opening area, which increases gradually after the shutter starts working, is the most appropriate to flash the strobe 17. Therefore, the flash timing of the strobe 20 can be found from the AV value.

In order to calculate the AV value, the distance (D) up to the main subject, which is found in the step 107, is substituted for an equation (2), and a guide number (GNo.) is substituted for an equation (3), so that a DV value and a GV value can be found.

$$DV=-2log_2 D \ldots \quad (2)$$

$$GV=2log_2 GNo. \ldots \quad (3)$$

Figure 5:
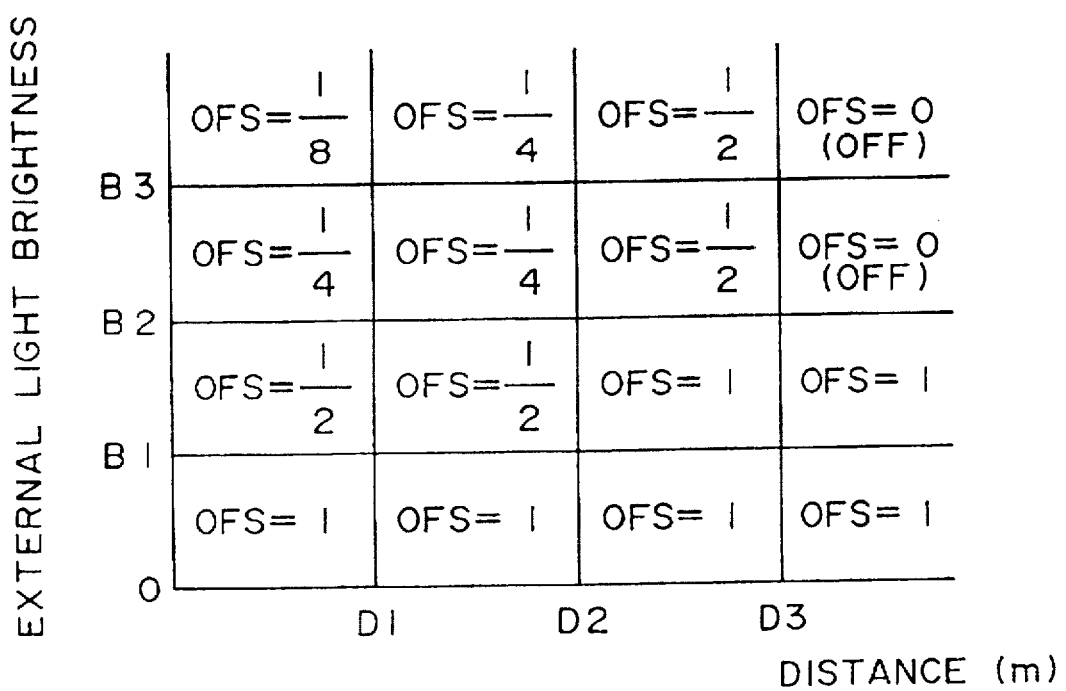
FIG. 5 is a view illustrating one example of a correction table.

Next, an OFS value, which is a correction value, is found from a reference correction table 21b, which is written in the ROM 21, with the reflectance R of the main subject being taken into consideration. The parameters of the reference correction table 21b are the brightness within the shot visual field when the reflectance of the main subject is a reference reflectance RO (for example 18%), and the distance up to the main subject, as shown in the example of FIG. 5.

In the reference correction table 21b of FIG. 5, the brightness within the shot visual field is classified into 4 levels ( below B1, B1–B2, B2–B3, over B3, B1<B2<B3), and the distance up to the main subject is classified into 4 levels ( below D1, D1–D2, D2–D3, over D3, D1<D2<D3) . Then, the OFS value, which is the correction value for the exposure of the strobe 17, is minutely allotted to each level (see FIG. 5). Basically, because only the external light brightness is not enough for the exposure when the external light brightness is lower than B1, the correction value OFS=1 for decreasing the exposure of the strobe 17, is allotted. When the external light brightness is higher than B1, the correction value OFS=½–⅛ is used for maintaining the exposure of the strobe 17. In this case, the decreased amount is adjusted to be large when the subject distance is short. Incidentally, the above-mentioned distances D1, D2, and D3 are, for example, 1.3 m, 2 m, and 9 m, respectively, and the strobe exposure is changed over in these distances (hereinafter referred to as a reference changeover distance).

The OFS value can be found from the brightness within the shot visual field, which is measured in Step 106, the distance up to the main subject, which is measured in Step 107, and the reflectance R, which is measured in Step 109, on the basis of the reference correction table 21b.

When the measured distance is more than the predetermined distance Ds, the reference correction table is applied. For example, when a value of the distance up to the main subject is between D1=1.3 m and D2=2 m, and the brightness is B2–B3; the OFS is found as ¼ from the reference correction table 21b. When the distance is longer than D3=9 m, and the brightness is B1–B2, the OFS is found as 1.

On the other hand, when the measured distance is less than the predetermined distance Ds, the reflectance of the main subject is measured by the reflectance measuring part (Step 109). Then, the following process is carried out in accordance with the measured reflectance. That is, a correction value OFS(R) for the measured reflectance R is found from the following equation (4) with a correction value OFS(RO).

$$OFS(R)=OFS(RO)\times RO/R \ldots \quad (4)$$

Then, the calculated correction value is applied.

To be concrete, if the distance Ds is decided as a value being between D2 and D3, the correction value is found as follows when, for example, the distance up the main subject is less than D1 and the measured reflectance is 36%. That is, $OFS=1\times(\frac{1}{2})=\frac{1}{2}$, when the brightness is less than B1, $OFS=\frac{1}{2}\times(\frac{1}{2})=\frac{1}{4}$, when the brightness is B1-B2, $OFS=\frac{1}{4}\times(\frac{1}{2})=\frac{1}{8}$, when the brightness is B2-B3, $OFS=\frac{1}{8}\times(\frac{1}{2})=\frac{1}{16}$, when the brightness is more than B3.

The predetermined distance Ds is not limited to the value between D2 and D3, and another value may be set as the distance Ds. Also, the reference reflectance RO is not limited to 18%, and another value may be set as the reference reflectance RO. Incidentally, the reflectance is twice of the average reflectance (18%) in the case of the face with a makeup, and is 3-4 times in the case of a person wearing a pure white dress. It is possible to photograph such objects under the short distance by the built-in flash camera of the present invention.

The calculated OFS value is substituted for the following equation (5), so that the FL value can be found.

$$FL=\log_2 OFS \ldots \quad (5)$$

The DV value, the GV value, the FL value, and the film sensitivity (SV), which are found from the abovementioned equations (1), (2), (3), and (5), are substituted for the following equation (6), so that the AV value can be found (Step 109).

$$AV=GV+SV+DV+FL-5 \ldots \quad (6)$$

Incidentally, the film sensitivity and the SV value correspond to each other, that is, SV5, 6, 7, 8, 9 . . . correspond to ISO 100, 200, 400, 800, 1600 . . . .

The processing (Step 112, 113) stands by until the shutter button 11 is fully pushed from the half-push state. If the button is not fully pushed and the finger is removed from the shutter button 11, the processing returns to the step 101. When the shutter button 11 is fully pushed, the shutter 19 is opened and closed so as to take a picture. The opening and closing of the shutter 19 are controlled on the basis of the EV value which is calculated in the step 110. Then, the strobe 17 is flashed at a timing which the opening area of the shutter 19 equals to the AV value which is calculated in the step 109 (Step 114). The exposure required for photographing can be obtained by the strobe 17.

The film is fed (Step 115) after the shutter 19 is closed, and the strobe 17 is charged (Step 116). Then, the processing waits if the shutter button 11 is half pushed (Step 117), and after a finger leaves from the shutter button 11 and the shutter button 11 returns to its original condition, the processing returns to the step 101.

This embodiment has been developed in consideration of the following point. That is, the exposure on a image surface is large in the case of the main subject having a high reflectance, and is small in the case of the main subject having a low reflectance. The built-in flash camera of this embodiment controls the exposure of the strobe in accordance with reflectance of the main subject. Therefore, the exposure on an image surface is set properly even if the reflectance of the main subject changes.

Next, the relationship between the exposure of the strobe 17, which is corrected by the correction table 21b, and the exposure of the external light within the shot visual field will hereunder be explained with reference to FIGS. 6, 7, 8, and 9. Incidentally, the film sensitivity is ISO 100 (SV=5) in FIGS. 6, 7, 8, and 9, which corresponds to each distance (below D1, D1-D2, D2-D3, over D3) in the correction table 21b.

Figure 6:
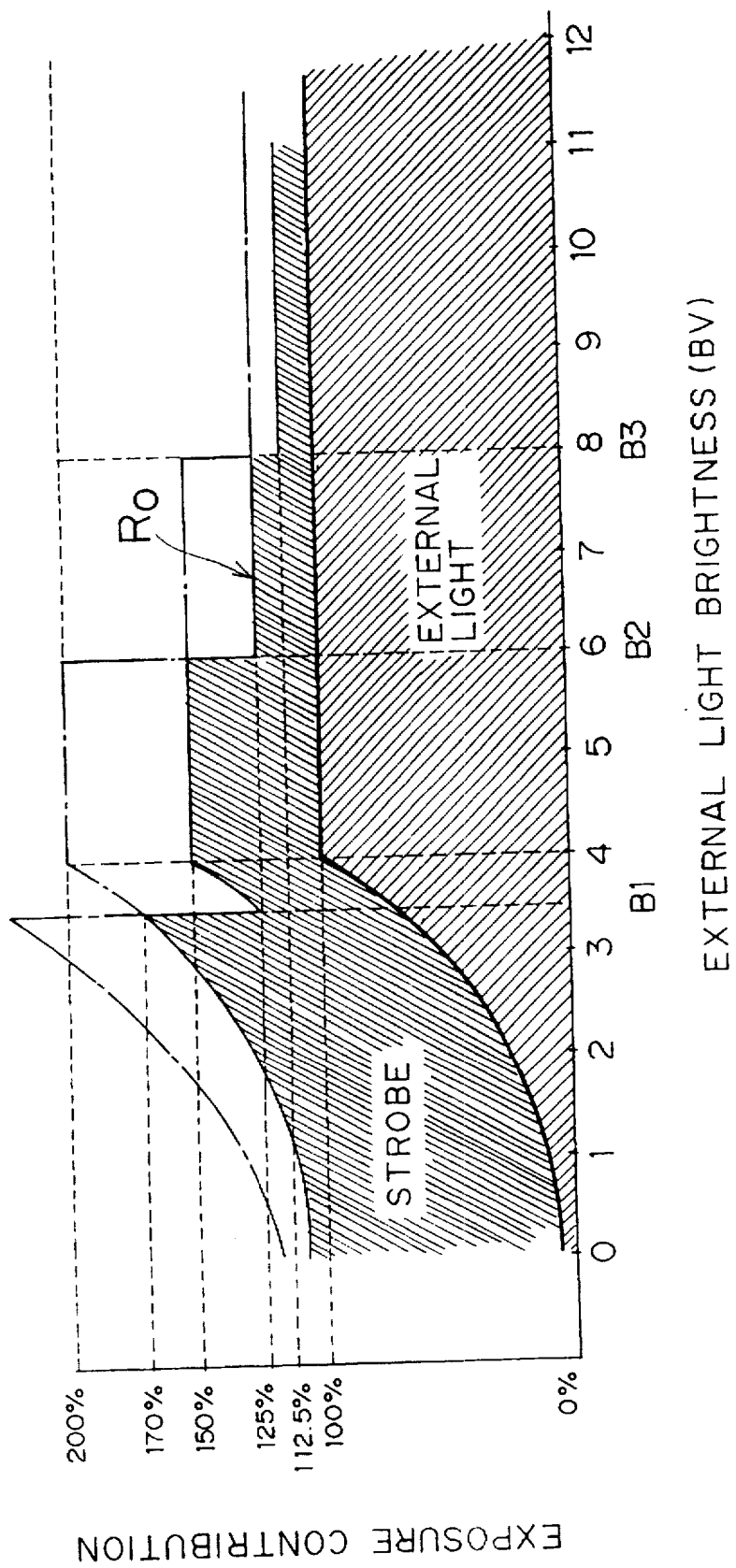
FIG. 6 is a view illustrating a relationship between an exposure of a strobe and an exposure of external light within a shot visual field when a distance between the camera and the object is less than D1.

FIG. 6 is a view illustrating the relationship between the exposure of the strobe 17 and the exposure of the external light when the distance between the camera and the object is less than D1.

In FIG. 6, the solid line indicates a graph in the case of the reference reflectance RO, and the dash and dotted line indicates a graph in the case when the strobe exposure control for the reference reflectance RO is carried out for the reflectance R of the main subject, which is twice of the reference reflectance RO (R=2×RO)

At first, an explanation is given of the case of the reference reflectance RO. When the external light brightness is less than BV4, the shutter 19 is opened only for a predetermined constant time,. because the shutter should not be opened for more than the predetermined constant time in order to remove the influence of a camera shake. Therefore, a sufficient exposure of 100%, which is required for photographing, is not provided by the external light only. That is, BV4 is the limitation brightness for a so-called automatic exposure (AE) control. Accordingly, the exposure of the external light keeps increasing until the external light brightness reaches BV4. When the external light brightness is more than BV4, the shutter 19 is controlled by the AE control function, so that the exposure of the external light is adjusted to keep the exposure of 100%. As a result, the exposure of the external light is fixed when the external light brightness is more than BV4.

On the other hand, the exposure of the strobe 17 is of 100% which is required for photographing when the external light brightness is less than B1. $OFS=1$, $OFS=\frac{1}{2}$, $OFS=\frac{1}{4}$, $OFS=\frac{1}{8}$ are respectively allotted for the external light brightness below B1, kB1-B2, B2-B3, over B3, in the correction table 21b.

The total exposure for exposing the film is the sum of the exposure of the external light and the exposure of the strobe. In the brightness (B1), which is lower than BV4 and in which the exposure contribution of the external light gradually becomes larger, the exposure of the strobe is changed over so as to decrease the exposure contribution of the strobe. That is, a changeover control is carried out so as to decrease the exposure contribution rate to 50% in a changeover brightness B1. As a result, the total exposure is prevented from being excessively larger than the reasonable exposure. Incidentally, the exposure of the strobe and the changeover brightness are determined in such a manner that the total exposure can always be a reasonable exposure.

Moreover, in the external brightness more than BV4, the exposure of the strobe 17 gradually decreases as the external light brightness becomes higher. That is, the exposure contribution rate is 50% in the brightness B1-B2 (EV6), 25% in the external light brightness B2-B3, 12.5% in over B3 (the solid line in FIG. 6).

When the external light brightness is high, if the strobe 17 is flashed in such a manner that the exposure of the strobe 17 is fixed, the ratio of the background to the object in the quantity of light is lowered. As a result, the background on a print looks dark even though the external light is well-lighted. In this embodiment, since the exposure of the strobe 17 gradually decreases as the external brightness becomes higher, the ratio of the background to the object in the quantity of light is not lowered even if the external light brightness is high. Therefore, even when the photographing is performed in the high brightness, the background on the print is not dark. As a result, the photographic atmosphere is not ruined. Incidentally, as described later, even if the distance between the camera and the object is more than D1, the exposure of the strobe 17 is adjusted so as to decrease gradually as the external light brightness becomes higher. Therefore, the same effect can be achieved even if the distance between the camera and the object is large.

When the distance between the camera and the object is less than D1, the exposure of the strobe 17 is extremely small (exposure contribution rate is 12.5%) in the external brightness of more than B3. When the object is only a short distance from the camera, the main subject occupies a larger area than the background, so the balance in the quantity of light between the main subject and the background is lost, and the main subject tends to be washed out on the photograph. In this embodiment, the light of the strobe is controlled to be extremely small when the object is only at a short distance from the camera and the external light brightness is high. As a result, the balance in the quantity of light between the object and the background is kept, and the object is prevented from being washed out on the photograph.

On the other hand, when the strobe exposure control for the reference reflectance RO is carried out even if the reflectance R of the main subject is twice of the reference reflectance RO, the exposure contribution becomes large just like the dash and dotted line of FIG. 6. Therefore, the reflectance is corrected by means of the equation (4) so as to obtain a proper exposure just like the solid line of FIG. 6.

The value of RO/R can be treated as a value which changes gradually, because the strobe exposure is gradually controlled. Moreover, if the strobe exposure can be controlled continuously, the value of RO/R can be treated as a value which changes continuously. Incidentally, when the reflectance R of the subject is excessively low compared to the reference reflectance RO, the strobe exposure control can be performed until the strobe exposure reaches a maximum value thereof.

Figure 7:
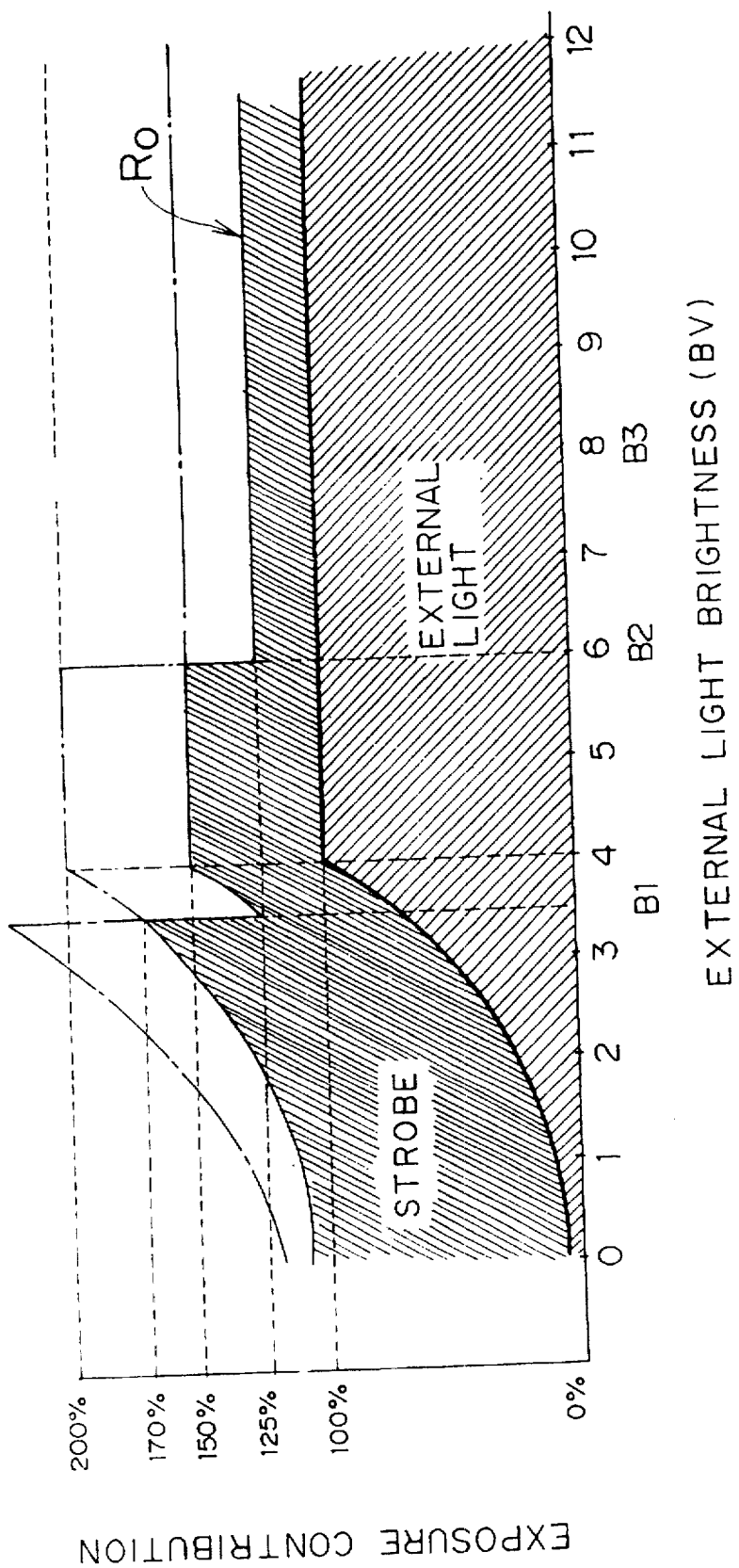
FIG. 7 is a view illustrating a relationship between the exposure of the strobe and the exposure of external light within the shot visual field when the distance between the camera and the object is from D1 to D2.

Fig.7 shows a relationship between the exposure of the strobe 17 and the exposure of the external light when the distance between the object and the camera is D1–D2.

In FIG. 7, the solid line indicates a graph in the case of the reference reflectance RO, and the dash and dotted line indicates a graph in the case when the strobe exposure control for the reference reflectance RO is carried out for the reflectance R of the main subject, which is twice of the reference reflectance RO (R=2×RO)

FIG. 7 shows that the exposure by the external light is the same as in FIG. 6. The exposure by the external light is the same as in FIG. 6 when the external light brightness is less than B2, however, a processing for decreasing the exposure of the strobe 17 to ½ is not carried out even if the external light brightness is more than B3. That is, it is confirmed by an experiment that the balance in the quantity of light between the object and the background is not lost when the distance between the camera and the object is D1–D2 and the external light brightness is more than B3. Therefore, the processing of decreasing the exposure of the strobe 17 to ½ is not carried out even when the external light brightness is B3.

When the strobe exposure control for the reference reflectance RO is carried out even if the reflectance R of the main subject is twice that of the reference reflectance RO, the exposure contribution becomes large just like the dash and dotted line of FIG. 6. Therefore, the reflectance is corrected by means of the equation (4) so as to obtain a proper exposure just like the solid line of FIG. 7. Incidentally, when the distance up to the main subject is shorter than the distance Ds, the above-mentioned correction is performed. On the other hand, when the distance up to the main subject is longer than the distance Ds, the correction is omitted.

Figure 8:
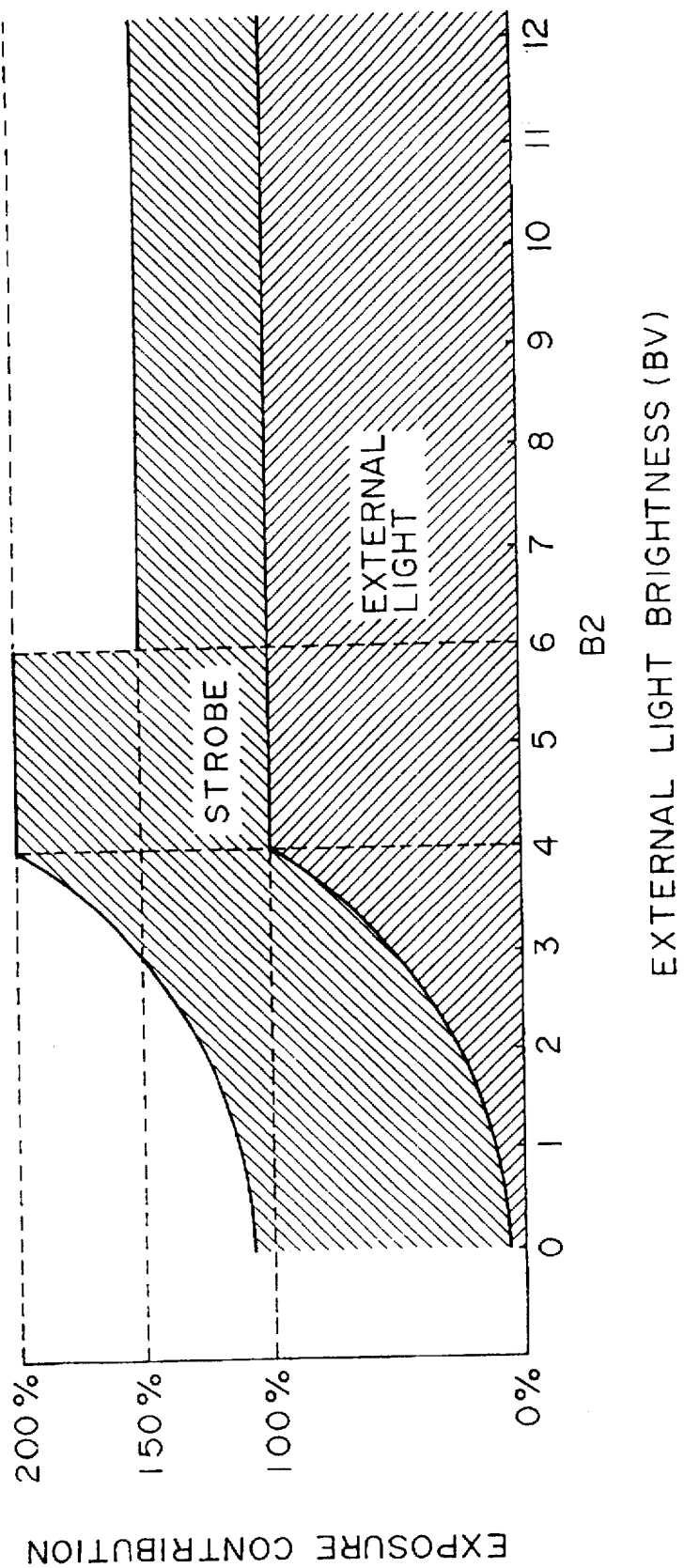
FIG. 8 is a view illustrating a relationship between the exposure of the strobe and the exposure of external light within the shot visual field when the distance between the camera and the object is from D2 to D3.

Next, FIG. 8 shows a relationship between the exposure of the strobe 17 and the exposure of the external light when the distance between the object and the camera is D2–D3. FIG. 8 is different from FIG. 7 in that the exposure of the strobe 17 does not decrease when the external light brightness is B1, and the exposure of the strobe 17 is 100% until the external light brightness is B2, and that the processing of decreasing the exposure of the strobe 17 to ½ is not carried out when the external light brightness is B3.

When the distance between the main subject and the camera is more than D2, that is, when the distance is longer than the case of FIG. 7, the effect from decreasing the exposure of the strobe 17 is not conspicuous in the external light brightness of less than BV3 compared with when the object is at only a short distance from the camera as shown in FIGS. 6 and 7. That is, it is confirmed by an experiment that the balance in the quantity of light between the object and the background is hardly lost, even if the total exposure is over the proper exposure in the whole area of the external light brightness. Incidentally, the reflectance of the subject is not measured because the distance up to the subject is longer that the distance Ds.

Figure 9:
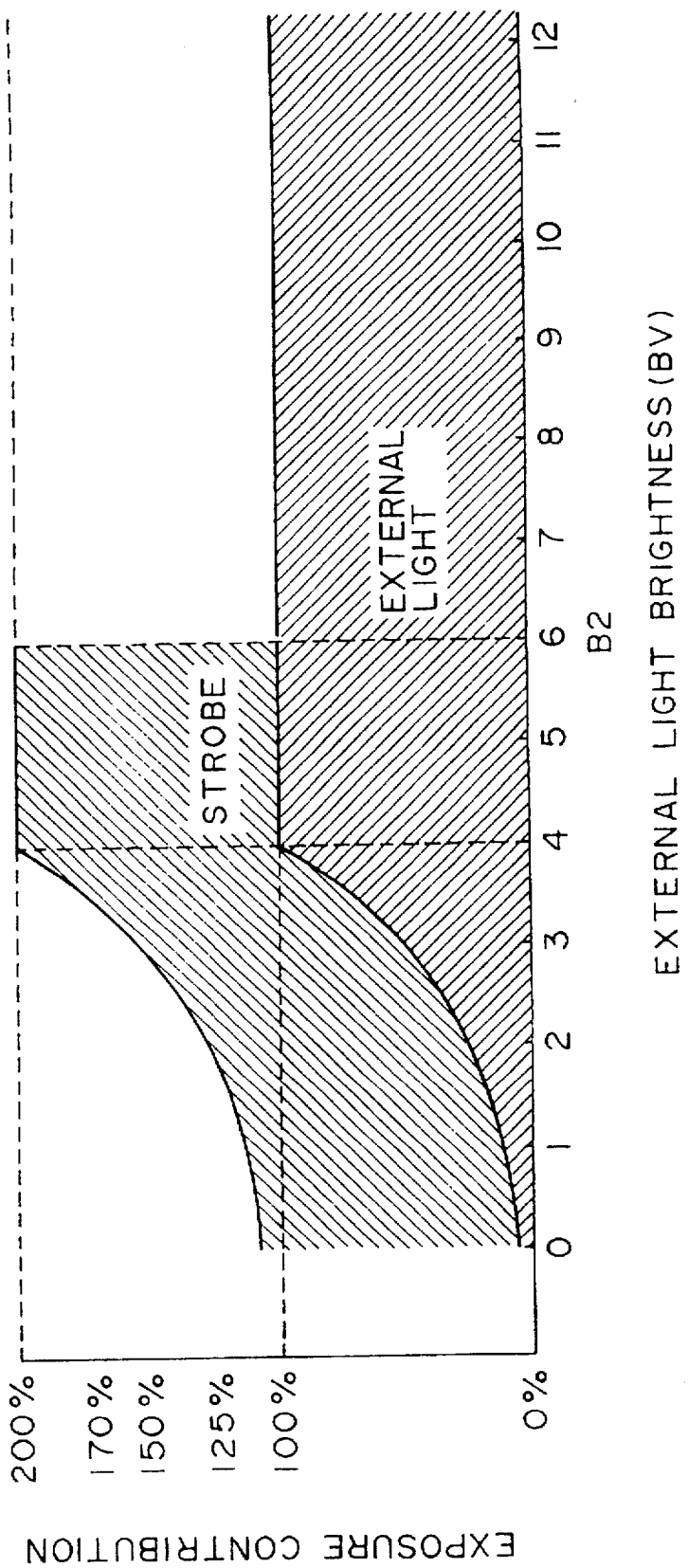
FIG. 9 is a view illustrating a relationship between the exposure of the strobe and the exposure of external light within the shot visual field when the distance between the camera and the object is more than D3.

Next, FIG. 9 shows a relationship between the exposure of the strobe 17 and the exposure of the external light when the distance between the object and the camera is more than D3. FIG. 9 is similar to FIG. 8 in that the exposure by the strobe 17 is 100% until the external light brightness is B2. However, the strobe light hardly reaches the object when the distance between the subject and the camera is more than D3, and the photographing is hardly influenced even if the strobe 17 is not flashed when the external light brightness is more than B2. Therefore, FIG. 9 is different from FIG. 8 in that the strobe 17 is not flashed when the external light brightness is more that B2.

In this embodiment, the explanation was given of the correction table which is shown in FIG. 5. However, the mode of the correction table is not limited to this. The external light brightness and the distance between the object and the camera may be classified into more or less levels than the correction table 21b which is shown in FIG. 5.

The above explanation relates to the film sensitivity ISO 100; However, the same effect can be achieved with respect to the other sensitivity by sliding the BV value.

Incidentally, the present invention is not limited to the above-mentioned embodiment, and there are variations of the present invention. For example, the light exposure is adjusted by subtly shifting the flash timing of the strobe from the shutter timing as shown in FIG. 2; However, the light exposure may be adjusted by changing the flash light quantity itself by fixing the flash timing of the strobe 17.

As has been described above, according to the built-in flash camera of the present invention, the exposure of the strobe is controlled in accordance with the distance up to the main subject, which is measured by the focusing part, and the reflectance of the main subject, which is measured by the reflectance measuring part. As a result, the exposure on the image surface can be set properly.

Furthermore, according to the present invention, the exposure of the strobe is decreased as the measured reflectance becomes high. As a result, it is possible to perform satisfactory photographing even if the reflectance of the main subject is excessively high or low.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A built-in flash camera including a strobe light therein, the built-in flash camera comprising:

a photometry part for measuring external light brightness within a shot visual field;

a focusing part for measuring distance between the camera and a main subject within the shot visual field;

a reflectance measuring part for measuring a reflectance of the main subject;

an automatic exposure mechanism for opening and closing a diaphragm shutter to obtain an exposure exposure under an external light brightness, greater than a predetermined reference external light brightness, the predetermined reference external light brightness being an external light brightness at which an optimum exposure is obtained when the shutter is open for a predetermined time; and a strobe light control part for controlling the strobe light to flash in connection with the opening and closing of the shutter and for varying the exposure of the strobe light in accordance with the measured distance and the measured reflectance;

wherein a reference reflectance RO is predetermined, R is defined as the measured reflectance, and wherein the strobe light control part sets the exposure of the strobe light based upon the ratio of RO/R;

wherein a strobe changeover brightness of the strobe light is set to a value less than the predetermined reference external light brightness.

2. A built-in flash camera including a strobe light therein, the built-in flash camera comprising:

a photometry part for measuring a brightness within a shot visual field;

a focusing part for measuring distance between the camera and a main subject within the shot visual field;

a reflectance measuring part for measuring a reflectance of the main subject;

an automatic exposure mechanism for opening and closing a diaphragm shutter to obtain an exposure exposure under an external light brightness, greater than a predetermined reference external light brightness, the predetermined reference external light brightness being an external light brightness at which an optimum exposure is obtained when the shutter is open for a predetermined time; and a strobe light control part for controlling the strobe light to flash in connection with the opening and closing of the shutter and for varying the exposure of the strobe in accordance with the measured brightness, the measured distance and the measured reflectance;

wherein a reference reflectance RO is predetermined, R is defined as the measured reflectance, and wherein the strobe light control part sets the exposure of the strobe light based upon the ratio of R0/R; wherein a strobe changeover brightness of the strobe light is set to a value less than the predetermined reference external light brightness.

3. A built-in flash camera as set forth in claim 2, wherein the strobe light control part decreases the exposure of the strobe light as the measured reflectance increases.

4. A built-in flash camera as set forth in claim 1, wherein a reference reflectance RO is predetermined, R is defined as the measured reflectance, and wherein the strobe light control part sets the exposure of the strobe based upon the ratio of RO/R.

5. A built-in flash camera as set forth in claim 2, wherein a reference reflectance RO is predetermined, R is defined as the measured reflectance, and wherein the strobe light control part sets the exposure of the strobe based upon the ratio of RO/R.

6. A built-in flash camera including a strobe light therein, the built-in flash camera comprising:

a photometry part for measuring external light brightness within a shot visual field;

a focusing part for measuring distance between the camera and a main subject within the shot visual field;

a reflectance measuring part for measuring a reflectance of the main subject, the reflectance measuring part including projecting means for projecting light to the main subject and light accepting means for receiving reflected light from the main subject, wherein the reflectance is measured in accordance with the received reflected light;

an automatic exposure mechanism for opening and closing a combination shutter and a stop blade to obtain an exposure under an external light brightness, greater than a predetermined reference external light brightness, the predetermined reference external light brightness being an external light brightness at which an optimum exposure is obtained when the shutter is open for a predetermined time; and a strobe light control part for controlling the strobe light to flash in connection with the opening and closing of the shutter and for varying the exposure of the strobe light in accordance with the measured brightness, the measured distance and the measured reflectance, the strobe light control part controlling the exposure of the strobe light by decreasing the exposure of the strobe light as the measured brightness increases;

wherein a reference reflectance RO is predetermined, R is defined as the measured reflectance and wherein the strobe light control part sets the exposure of the strobe light based upon the ratio of RO/R;

wherein a strobe changeover brightness of the strobe light is set to a value less than the predetermined reference external light brightness.

7. A built-in flash camera as set forth in claim 6, wherein the strobe light control part decreases the exposure of the strobe light further as the distance measured by the focusing means decreases.

8. A built-in flash camera as set forth in claim 6, wherein the focusing part includes projecting means for projecting light to the main subject and light accepting means for receiving reflected light from the main subject, and wherein the focusing part measures both the distance between the camera and the main subject and a reflectance of the main subject in accordance with the received reflected light.

9. A built-in flash camera as set forth in claim 2, wherein the focusing part includes projecting means for projecting light to the main subject and light accepting means for receiving reflected light from the main subject, and wherein the focusing part measures both the distance between the camera and the main subject and a reflectance of the main subject in accordance with the received reflected light.

10. A built-in flash camera as set forth in claim 7, wherein the strobe light control part decreases the exposure of the strobe light further as the reflectance measured by the reflectance measuring means increases when the measured distance is relatively short to the extent that all of the projected light from the projecting means reaches the main subject.

11. A camera including a strobe light comprising:

first means for measuring external light brightness within a visual field;

second means for measuring distance between the camera and a main subject within the visual field;

third means for measuring a reflectance of the main subject;

automatic exposure control means for automatically obtaining exposure upon the measured external light being greater than a predetermined brightness; and strobe light control means for controlling strobe light exposure to increase the predetermined exposure based upon the measured distance and measured reflectance;

wherein a reference reflectance RO is predetermined, R is defined as the measured reflectance, and wherein the strobe light control means sets the exposure of the strobe light based upon the ratio of RO/R;

wherein a strobe changeover brightness of the strobe light is set to a value less than the predetermined reference external light brightness.

12. The camera of claim 11, wherein the strobe light control means controls the strobe light exposure based upon the measured reflectance upon the measured distance being less than a predetermined value.

13. The camera of claim 11, wherein the strobe light exposure is further controlled based upon measured brightness.

14. The camera of claim 11, wherein the strobe light exposure is decreased as measured reflectance increases.

15. The camera of claim 13, further comprising:

a memory for storing predetermined offset values, for maintaining or reducing the strobe light exposure at or from a predetermined exposure level, according to predetermined brightness and predetermined distance values, the predetermined offset values being used by the strobe light control means based upon the measured brightness and the measured distance.

16. The camera of claim 15, wherein the predetermined offset values are further varied based on the measured reflectance to thereby further reduce the strobe exposure from a predetermined level.

17. The camera of claim 16, wherein the predetermined offset values are decreased as measured reflectance increases.

18. The camera of claim 16, wherein the predetermined offset values are only further varied based upon the measured reflectance, upon the measured distance being less than a predetermined value.

19. The camera of claim 11, wherein the third means only measures reflectance when the measured distance is less than a predetermined value.

20. The camera of claim 16, wherein a ratio of a predetermined reflectance and the measured reflectance is used to vary predetermined offset values.

* * * * *